June 27, 1967 S. DARLINGTON 3,328,528

APPARATUS FOR INTERCHANGING TIME AND FREQUENCY SIGNALS

Filed Nov. 4, 1963

INVENTOR
S. DARLINGTON
BY
F. E. Kersey
ATTORNEY

United States Patent Office 3,328,528
Patented June 27, 1967

3,328,528
APPARATUS FOR INTERCHANGING TIME AND FREQUENCY SIGNALS

Sidney Darlington, Passaic Township, Morris County, N.J., assignor to Bell Telephone Laboratories, Incorporated, New York, N.Y., a corporation of New York Filed Nov. 4, 1963, Ser. No. 321,185
4 Claims. (Cl. 179—15)

ABSTRACT OF THE DISCLOSURE

Reciprocal transformations between time domain, e.g., time-division multiplex, and frequency domain, e.g., frequency-division multiplex, signals are provided. A dispersive medium appropriately delays especially-modified input signals to provide either simultaneously-occurring, distinct-frequency signals or sequentially-occurring pulse signals as the desired output.

Figures 1, 2:
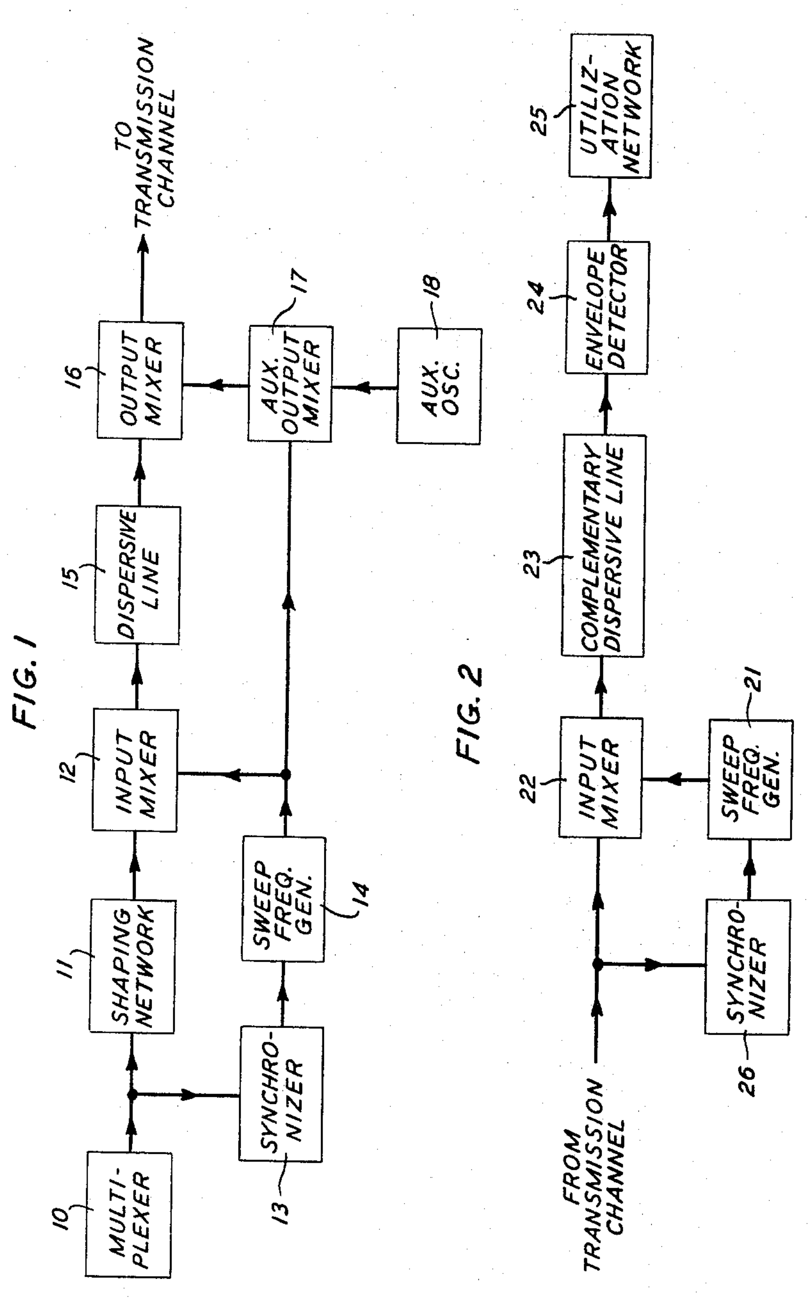

This invention relates to the conversion of signals and more particularly to the interconversion of signals between time and frequency.

The informational content of signals can be represented in a variety of ways. It may take the form of oscillations that are discrete in frequency and sustained over an extended interval. Or it may be encoded into pulse signals of short duration. The former are said to be functions of frequency, the latter functions of time.

In any event, signals taking one form in one part of the system may be required to assume a different form elsewhere. For example, a local information source may operate on a time division basis where each of a multiplicity of message channels is given a preassigned and recurrent time slot interval. However, the resulting multiplex of signals may be intended for transmission by a set of carriers on which each message channel is assigned a separate and distinctive frequency. Similarly, a message wave originating as sequential pulse code modulation may be intended for a receptor that responds to multifrequency transmission.

Accordingly, it is an object of the invention to facilitate the reciprocal transformations, i.e., interconversion, of signals that are functions of time and frequency. Related objects are to transform time division signals into their frequency division counterparts and sequential pulse code modulation signals into their multifrequency counterparts.

To accomplish the foregoing and related objects the invention makes use of a dispersive line for which phase delay varies in a preassigned fashion over a preassigned frequency interval. As a result the various frequency constituents applied to the line are delayed differently during the course of their passage through it. Consequently a compressed, varying frequency signal can be expanded into a single frequency signal, and a single frequency signal can be compressed.

Thus an appropriately shaped pulse signal that amplitude modulates the output of a sweep frequency generator gives rise, on the dispersive line, to a signal of frequency dependent upon the time of origin of the pulse signal. Conversely, a constant frequency signal that is mixed with the output of a sweep frequency generator gives rise to a pulse signal whose time position on the line depends upon the original frequency.

In one aspect of the invention, a plurality of successive pulse signals, such as those produced by time division multiplexing or by sequential pulse code modulation, are shaped into oscillations of initially increasing and subsequently decreasing magnitudes, and used to amplitude modulate the output of a sweep generator. The resulting signals are applied to a delay line for which phase delay varies in a substantially linear fashion over a preassigned frequency interval. As a result, the signals are expansively dispersed into a plurality of distinctive frequency signals that appear simultaneously at the output of the line. In the case of time division multiplexing, the result is the desired conversion into frequency division multiplexing; while in the case of sequential pulse code modulation the output is in a multifrequency code.

Conversely, in another aspect of the invention a plurality of simultaneous distinctive frequency signals, such as those produced by frequency division multiplexing, modulate the output of a sweep generator. Subsequently, the modulated signals are compressively dispersed by a linear delay line to produce a plurality of signals that appear at successively spaced positions along the line.

Where signals are to be compressed in one part of a system and expanded in another, the delay lines advantageously have complementary dispersion characteristics.

Other aspects of the invention will become apparent after considering several illustrative embodiments, taken in conjunction with the drawings, in which:

FIG. 1 is a block diagram of a converter from time division to frequency division multiplex; and FIG. 2 is a block diagram of a converter from frequency division to time division multiplex.

With reference to FIG. 1, pulse signals originating at a time division multiplexer 10 are modified by a shaping network 11 and applied to an input mixer 12 to modulate the output of a sweep frequency generator 14. When the wave thus modulated is applied to a dispersive line 15 with a linear delay characteristic, the output of the line is in a frequency multiplex form. The multiplex frequencies are controlled by an output mixer 16, together with an auxiliary mixer 17 and auxiliary oscillator 18.

The pulse signals are shaped by a network that converts each one into its sinc function counterpart. The sinc function, whose properties are described in Probability and Information Theory by P. M. Woodward, McGraw-Hill, New York, 1955, is commonly written as sin $x/x$. It is a harmonic-like oscillation of initially increasing and subsequently decreasing amplitudes with a peak amplitude at a time corresponding to the point of origin of the associated pulse signal.

In essence, the shaping network 11 is a filter whose frequency response characteristic deviates from rectangularity to the extent that the pulse signal departs from an impulse. Filters with frequency characteristics tailored in this fashion are well known in the art.

Besides being applied to the shaping network, the output of the multiplexer also extends to a synchronizer 13 of conventional construction. The latter, which may be a crystal-tuned oscillator operating at the pulse repetition frequency, controls the sweep frequency generator 14. During each synchronizing interval, the frequency of the generator is swept linearly above and below a quiescent frequency. Consequently the output of the generator has a sawtooth frequency variation.

At the input mixer 12 the sinc signals are combined with the sweep frequency output to produce an amplitude modulated wave that is applied to the dispersive line 15. Because of its linear delay the line expands the sinc compressed, modulated output. The result is a constant frequency signal governed by the time of origin, together with a sweep frequency component that is removed by the output mixer 16. The latter derives its mixing frequency from the sweep frequency generator 14 and an auxiliary oscillator 18 by way of an auxiliary mixer 17. The auxiliary oscillator determines the mid-band frequency of the frequency multiplex output.

To understand more fully the action of the dispersive line in converting a pulse signal into its constant frequency counterpart, consider a single channel of a multiplex set. Following Woodward, to which reference was made earlier, the normalized pulse signal of a single channel is rect$(t)$ which is of unit magnitude during the pulse interval and zero elsewhere, i.e., it is a rectangular wave function. Since the channels under consideration are produced on a time division basis, a number $n$ of them are confined to a recurrent time division interval T. Thus the time slot allotted to a single channel is $T/n$.

When the pulse signal rect$(t)$ is passed through the shaping network, the output becomes $$A \sin \pi k(t-t_0)/\pi k(t-t_0), \text{ i.e., } A \operatorname{sinc} k(t-t_0)$$

where $t_0$ is the time of the peak amplitude,
$k$ is a constant whose proportionment is related to $T/n$ in a manner to be described subsequently and
$A$ is a scale factor proportional to the amplitude of the input pulse signal.

The sweep frequency generator produces a carrier in the form $$\cos(\omega t+\tfrac{1}{2}qt^2+\beta)$$

where $\omega+qt$ is the frequency,
$q$ is a constant which determines the rate at which the the frequency increases with time, and
$\beta$ is a constant phase angle.

The phase angle $\beta$ is a part of the cumulative phase shift of the carrier wave associated with the conversion process. It does not otherwise affect the conversion and is not considered further.

Consequently, by amplitude modulation of the sweep frequency carrier with the output of the shaping network, the resulting wave applied to the dispersive line 15 is in the form $A \operatorname{sinc} k(t-t_0) \cos(\omega+\tfrac{1}{2}qt^2)$.

But the line, taken with respect to an impulse alone, has a response $\delta(t)$ that is similar in form. Omitting a constant delay, which does not affect the conversion process, the impulse response is $$\delta(t)=\cos(\omega t-\tfrac{1}{2}qt^2)$$

where $q$ is now a constant of the dispersive line and is adjusted to be substantially the same as the constant which represents the rate of change of frequency of the sweep frequency generator. Such a line is said to have a linear envelope phase delay with frequency since the Fourier transform of the impulse response $\delta(t)$ has a phase slope which is substantial linear with frequency over the pertinent frequency interval.

The magnitude of the $q$ factor of the line, and hence the slope of its linear delay characteristic, is determined by the length of the line and the way it is fabricated. For a tapered, chemically milled aluminum strip line, the delay characteristic is determined by the rate at which the strip line is withdrawn from an etching bath. One such kind of line, reported by A. H. Fitch in 33 Journal of the Acoustical Society of America 1658 (1961), is linear within $\pm 1.5\%$ over a 50% bandwidth. Another suitable realization of the line, among the many available, is that disclosed in my Patent 2,678,997, issued May 18, 1954.

The output of the line is the convolution of the input and the impulse response, as described on page 26 of Woodward. For the dispersive line 15, this is in the form $$AF(qt)\cos[(\omega+qt_0)t-\tfrac{1}{2}qt^2]$$

where $F(qt)$ is defined by identifying $F(\lambda)$ with the Fourier transform of sinc $kt$.

But the transform of sinc $kt$ is proportional to rect $[\lambda/(2\pi k)]$ and $F(qt)$ is proportional to rect $[qt/(2\pi k)]$.

The constants $q$ and $k$ are desirably proportioned in accordance with Equation 1:

$$q=\frac{2\pi}{T}k \tag{1}$$

corresponding to which the factor $F(qt)$ constrains the wave $\cos[(\omega+qt_0)t-\tfrac{1}{2}qt^2]$ to the interval T, independently of the timing $t_0$ of the original pulse signal.

As far as each wave $\cos[(\omega+qt_0)t-\tfrac{1}{2}qt^2]$ is concerned, it contains two frequency components. The first component $(\omega+qt_0)$ is governed by the time position $t_0$ of the channel signal with which it is associated. The second component is a sweep frequency $qt$ that does not depend upon $t_0$ and is removed by the output mixer 16.

Thus, corresponding to a sequence of channel signals within an interval T, there is a set of frequency multiplex signals whose carrier is determined by the auxiliary oscillator 18.

Returning now to the proportionments of the $k$ and $q$ factors in Equation 1, if there is to be a sequence of $n$ input pulse signals in a recurrence interval T, the corresponding sinc signals are spaced at time intervals $T/n$. Hence, under this circumstance in a multifrequency system in accordance with the invention the various channels are spaced at radian frequency intervals $q(T/n)$ so that the bandwidth per channel is made proportional to the time slot per channel by the amount of the $q$ factor as stated in Equation 2A:

$$B/n=q(T/n) \tag{2A}$$

where

B is the bandwidth of the frequency division multiplex signals,
$n$ is the number of channels,
T is the time division multiplex interval, and
$q$ is the dispersive line factor.

Equation 2A reduces directly to Equation 2B:

$$q=B/T \tag{2B}$$

In addition to the relationship between bandwith and time interval set forth in Equation 2A, it is desirable to condition the $q$ factor so that the various multiplex frequencies are not too close to each other. Taking into account the Nyquist criterion for double sideband signaling, each channel has a bandwith of $2\pi/T$, making the over-all bandwith B for $n$ channels that of Equation 3A:

$$B=2\pi n/T \tag{3A}$$

Therefore, to prevent overlap and facilitate channel separation, the $q$ factor desirably satisfies the relationship expressed in Equation 3B:

$$q=2\pi n/T^2 \tag{3B}$$

where $2\pi$ is a spacing factor and the other symbols are as for Equation 2A.

When the $q$ factor of Equation 3B is introduced into Equation 1, the $k$ factor of that equation satisfies the relationship of Equation 3C:

$$k=n/T \tag{3C}$$

According to the Nyquist sampling theorem, the value of $k$ given by Equation 3C is the minimum that permits the separation of shaped signals, each represented by the waveform A sinc $k(t-t_0)$ for various values of $t_0$.

There is also the consideration that for the kind of multiplex conversion illustrated, the quiescent frequency of the sweep frequency generator should be high compared with the bandwidth of the resulting frequency division multiplexing signals.

When it is desired to reconstitute the multiplex output signals from FIG. 1 into their original input form, they are applied to the converter of FIG. 2.

Initially, the transmitted signals are modulated by a sweep frequency generator 21 and an input mixer 22. They subsequently enter a dispersive line 23 whose phase delay is complementary to that of the line 15 in FIG. 1, i.e., it is a linearly decreasing function of frequency instead of a linearly increasing function of frequency as in FIG. 1. After passing through an envelope detector 24 the emergent signals are in a time division multiplex form and are subjected to terminal processing in a utilization network 25. Coordination of the sweep frequency generator 21 with the incoming frequency multiplex signals is achieved with a synchronizer 26 of standard design and which responds to the incoming signals, e.g., transitions in amplitude level of one of the frequency multiplex waves. Alternatively the coordination can be achieved using the synchronization disclosed in my copending application Ser. No. 199,854, filed June 4, 1962, now Patent No. 3,299,357.

Because of the sweep frequency generator 21, the input to the complementary dispersive line 23 is similar in form to the output of the dispersive line 15 in FIG. 1. Hence the output of the dispersive line, being complementary, resembles the input to the dispersive line 15 in FIG. 1 and is a sequence of sinc signals. The envelope detector 24 converts the latter into a sequence of pulse signals which may be shaped by the utilization network 25.

To achieve a complementary dispersion without using a complementary line, the incoming signals modulate a carrier. The lower sideband modulation products contain frequency constituents that are inverted in the same way that they would have been had they passed through a complementary line.

Other adaptations and modifications of the invention will occur to those skilled in the art.

What is claimed is:

1. Apparatus for converting a sequence of time division multiplex signals occurring during time interval of T to frequency of division multiplex signals which comprises a multiplexer, a shaping network having an input and an output, said input being connected to said multiplexer, said shaping network having a transfer function giving rise to a sequence of sinc signals in response to said sequence of time division multiplex signals, a sweep frequency generator having an input and an output, a synchronizer interconnecting the input of said shaping network with the input of said sweep generator, a mixer interconnecting the output of said shaping network with the output of said sweep frequency generator, and a dispersive line having an input and output, the input of said line being connected to said mixer, said dispersive line arranged to provide for dispersing the frequency constituents of signals applied at said input of said dispersive line by an amount directly proportional to the number of time division signals in time interval T and inversely proportional to $T^2$ thereby obtaining frequency division multiplex signals at the output.

2. Apparatus for converting signals from time division multiplex to frequency division multiplex which comprises a multiplexer, a shaping network having an input and an output, said input being connected to said multiplexer, a sweep frequency generator having an input and an output, a synchronizer interconnecting the input of said shaping network with the input of said sweep generator, a first mixer interconnecting the output of said shaping network with the output of said sweep frequency generator, a dispersive line having an input and an output, the input of said line being connected to said mixer, a second mixer connected to the output of said dispersive line, and means for applying a sweep frequency wave to said second mixer.

3. Apparatus as defined in claim 2 wherein said means for applying a sweep frequency wave comprises a third mixer interconnecting the output of said sweep frequency generator with said second mixer, and an auxiliary oscillator connected to said third mixer.

4. Apparatus for converting frequency division multiplex signals to time division multiplex signals which comprises a mixer having two input and an output, said frequency division signals being applied to one of said inputs, a sweep frequency generator connected to the other of said inputs, means for synchronizing said generator at multiplex intervals, a dispersive line having an input and an output, the input being connected to the output of said mixer, said dispersive line having a transfer function giving rise to a sequential plurality of sinc signals, each of said sinc signals corresponding to a component of said frequency division signals, an envelope detector connected to the output of said dispersive line, for generating a pulse corresponding to each sinc signal, and a pulse shaping network for converting said pulses into time division signals.

References Cited

UNITED STATES PATENTS

| | | | |
|---|---|---|---|
| 2,954,465 | 9/1960 | White | 325—332 |
| 3,160,711 | 12/1964 | Schroeder | 179—15 |
| 3,197,563 | 7/1965 | Hamser et al. | 179—15 |
| 3,205,310 | 9/1965 | Schlichte | 179—15 |

JOHN W. CALDWELL, *Primary Examiner.*

ROBERT L. GRIFFIN, *Examiner.*